Jan. 26, 1932.   C. C. FARMER   1,842,514
BRAKE PIPE CUT-OFF VALVE
Filed Nov. 24, 1928
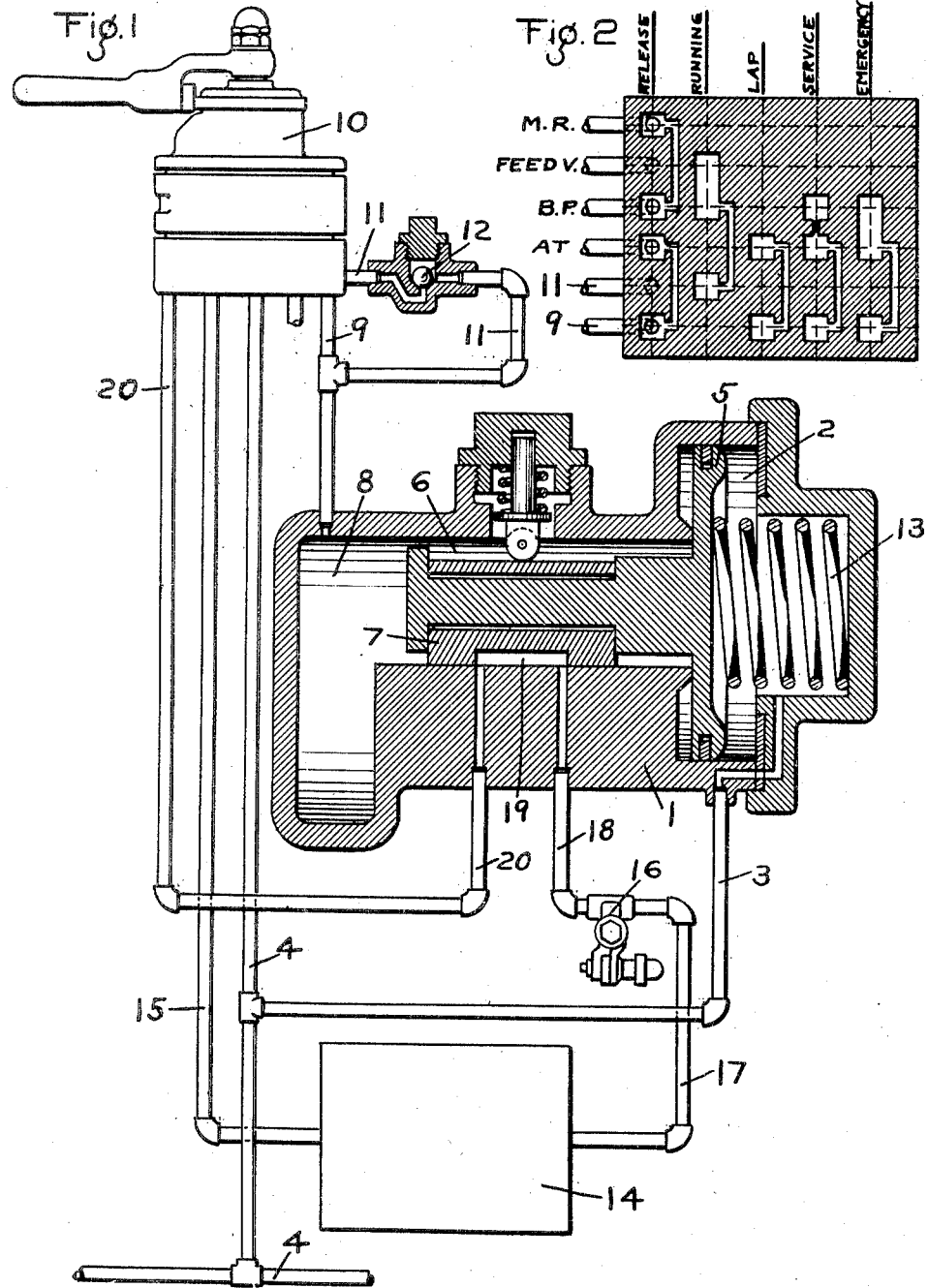
INVENTOR
CLYDE C. FARMER
BY Wm. N. Cady
ATTORNEY Patented Jan. 26, 1932

1,842,514

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE PIPE CUT-OFF VALVE

Application filed November 24, 1928. Serial No. 321,549.

This invention relates to fluid pressure brakes, and more particularly to an automatic brake system, in which the brakes are applied upon a reduction in brake pipe pressure.

Sometimes on a long train, a section of the train may be detached without the engineer becoming aware of the fact. The engineer's brake valve will then be in the usual running position in which fluid under pressure is supplied to the brake pipe from the usual feed valve device, which is undesirable under such circumstances.

The principal object of my invention is to provide means operating upon a reduction in brake pipe pressure initiated at any point in the train except at the brake valve device, to automatically cut off the supply of fluid under pressure to the brake pipe.

In the accompanying drawings; Fig. 1 is a diagrammatic view, partly in section, of a fluid pressure brake equipment embodying my invention; and Fig. 2 a diagram showing the air connections made in the different positions of the brake valve device.

According to my invention, a valve device is provided comprising a casing 1 having a piston chamber 2, connected by pipe 3 to the usual brake pipe 4 and containing a piston 5, and having a valve chamber 6 containing a slide valve 7 adapted to be operated by piston 5. The valve chamber 6, which may have its volume enlarged by the addition of chamber 8, is connected to a pipe 9, which leads to the seat of the usual rotary valve of the brake valve device 10.

A pipe 11, having a check valve 12 therein, leads from pipe 9 to the seat of the rotary valve of the brake valve device. A coil spring 13 in piston chamber 2 urges the piston 5 toward the left.

The usual main reservoir 14 is connected by pipe 15 to the rotary valve chamber of the brake valve device and from the main reservoir, fluid under pressure is supplied to the usual feed valve device 16 through pipe 17. In the left hand position of slide valve 7, fluid at reduced pressure is supplied from pipe 18, through cavity 19, to feed valve pipe 20, leading to the brake valve device.

In the release position of the brake valve device, the main reservoir is connected to the brake pipe, and the pipe 9 is connected to the atmosphere, while the pipe 11 is blanked by the rotary valve of the brake valve. In running position, the feed valve 16 is connected to the brake pipe and the pipe 11 is also connected to the brake pipe, while the pipe 9 is blanked.

In lap position, the pipe 9 is connected to the atmosphere and in service and emergency positions, the pipe 9 is connected to the atmosphere, as well as the brake pipe 4.

With the brake valve device in the normal running position, fluid under pressure is supplied from the brake pipe to pipe 11 and past the check valve 12 to the valve chamber 6, so that said valve chamber is charged at the same pressure as the piston chamber 2 and consequently the spring 13 maintains the piston 5 in its left hand position, as shown in the drawing, the pipe 9 being closed at the rotary valve of the brake valve device.

If the train should part, the brake pipe pressure will be reduced and consequently the pressure in piston chamber 2 will be reduced. Fluid under pressure in valve chamber 6 can not flow back to the train pipe by way of pipe 11, by reason of check valve 12, nor by way of pipe 9, which is blanked, and therefore, when the brake pipe pressure is reduced in the train, the piston 5 will be shifted to its outer position, by the fluid pressure in valve chamber 6, so that communication from the feed valve device 16 to pipe 20 is cut off and thereby the flow of fluid under pressure from the feed valve device by way of the brake valve device is cut off.

The brakes may be released by moving the brake valve handle to release position, in which position, fluid under pressure is supplied from the main reservoir to the brake pipe and in which pipe 9 is connected to the atmosphere, so that the chamber 6 is vented to the atmosphere and the piston 5 is moved back to its inner position by spring 13. After the brakes have been released, the brake valve may be turned to running position, in which the brake pipe is connected to the chamber 6.

In service and emergency application positions, the pipe 9 is connected to the atmosphere, so that piston 5 is maintained in its inner position by spring 13.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake pipe, a feed valve device, and a brake valve device having a position for supplying fluid under pressure from said feed valve device to the brake pipe, of a valve for controlling communication from said feed valve device to the brake valve device and a piston, having one side subject to fluid under pressure and the opposite side subject to the brake pipe pressure and operated directly by a reduction in brake pipe pressure on one side and the fluid pressure on the opposite side for operating said valve.

2. In a fluid pressure brake, the combination with a brake pipe, a feed valve device, and a brake valve device having a position for supplying fluid under pressure from said feed valve device to the brake pipe, of a valve for controlling communication from said feed valve device to the brake valve device, a spring, and a piston, subject on one side to brake pipe pressure and the pressure of said spring and on the opposite side to fluid under pressure, and operated directly by a reduction in brake pipe pressure on one side for operating said valve.

3. In a fluid pressure brake, the combination with a brake pipe, and a feed valve device for supplying fluid under pressure to the brake pipe, of a valve device for controlling communication through which said feed valve device is connected to the brake pipe and subject to the opposing pressures of the brake pipe and a chamber, and a brake valve device having a running position in which fluid under pressure is supplied to said chamber and a release position in which said chamber is connected to the atmosphere.

4. In a fluid pressure brake, the combination with a brake pipe, and a feed valve device for supplying fluid under pressure to the brake pipe, of a valve device for controlling communication through which said feed valve device is connected to the brake pipe and subject to the opposing pressures of the brake pipe and a chamber, a brake valve device having a running position in which fluid under pressure is supplied to said chamber, and a check valve for preventing back flow from said chamber.

5. In a fluid pressure brake, the combination with a brake pipe, and a feed valve device for supplying fluid under pressure to the brake pipe, of a valve device for controlling communication through which said feed valve device is connected to the brake pipe and subject to the opposing pressures of the brake pipe and a chamber, a brake valve device having a running position in which the brake pipe is connected to said chamber, and a check valve for preventing back flow from said chamber to the brake pipe.

In testimony whereof I have hereunto set my hand, this 22nd day of November, 1928.

CLYDE C. FARMER.